Figure 13:
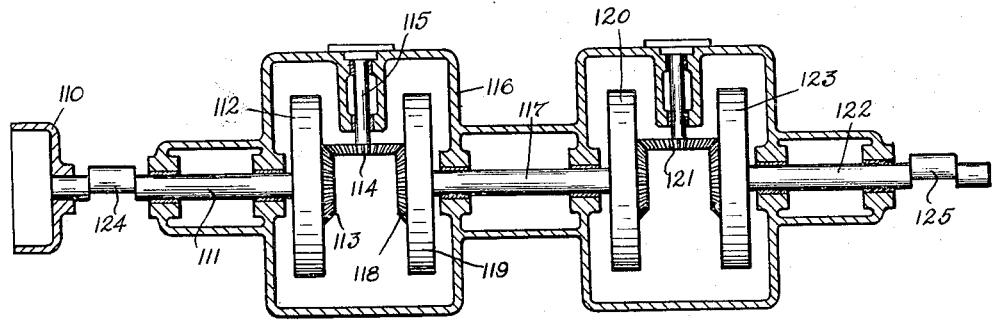

Jan. 30, 1940.　　　W. J. PARKS　　　2,188,482
RECIPROCATING MECHANISM
Filed Feb. 17, 1937　　　4 Sheets-Sheet 1
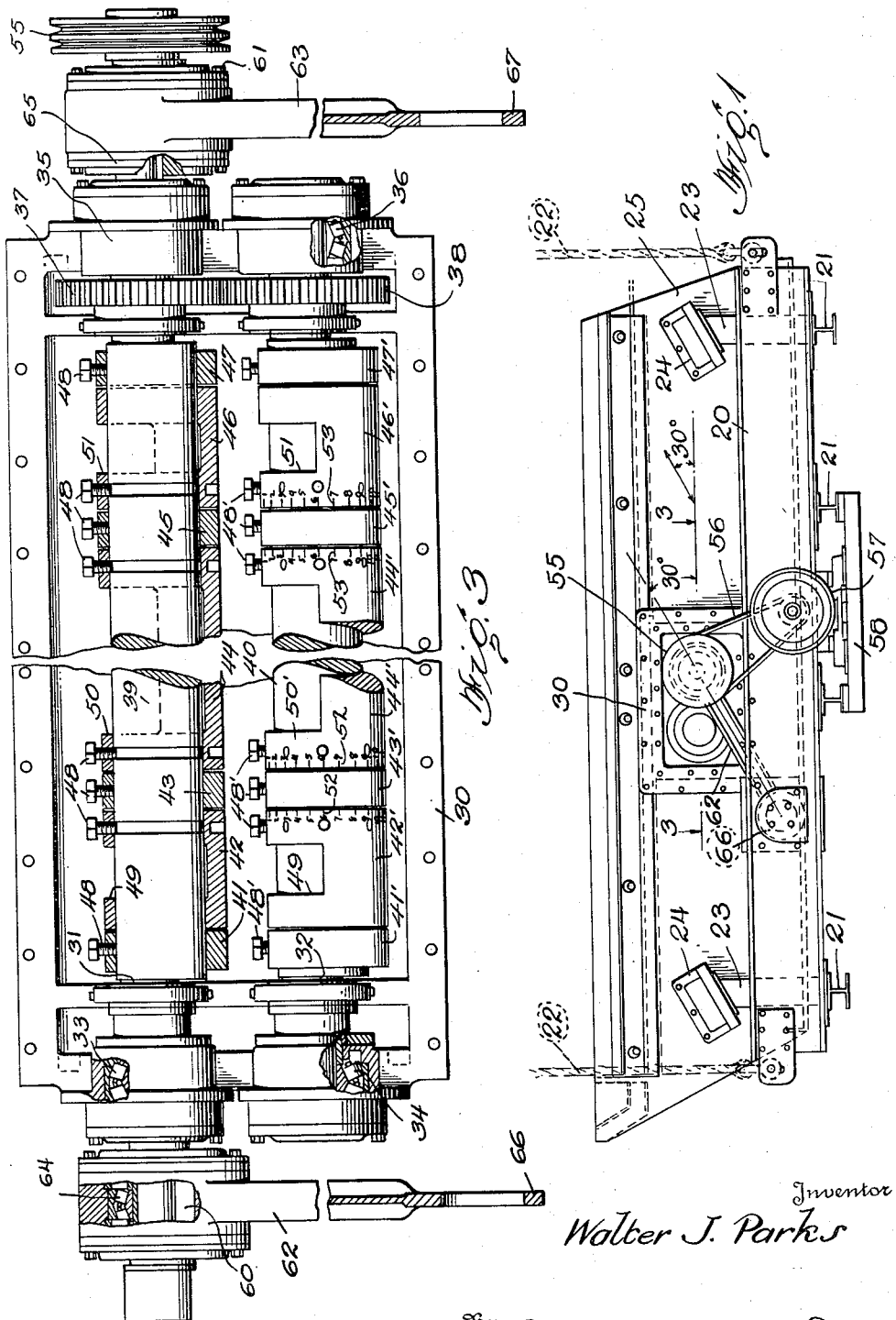
Inventor
Walter J. Parks
By Fay Oberlin & Fay
Attorneys Jan. 30, 1940.  W. J. PARKS  2,188,482
RECIPROCATING MECHANISM
Filed Feb. 17, 1937  4 Sheets-Sheet 2
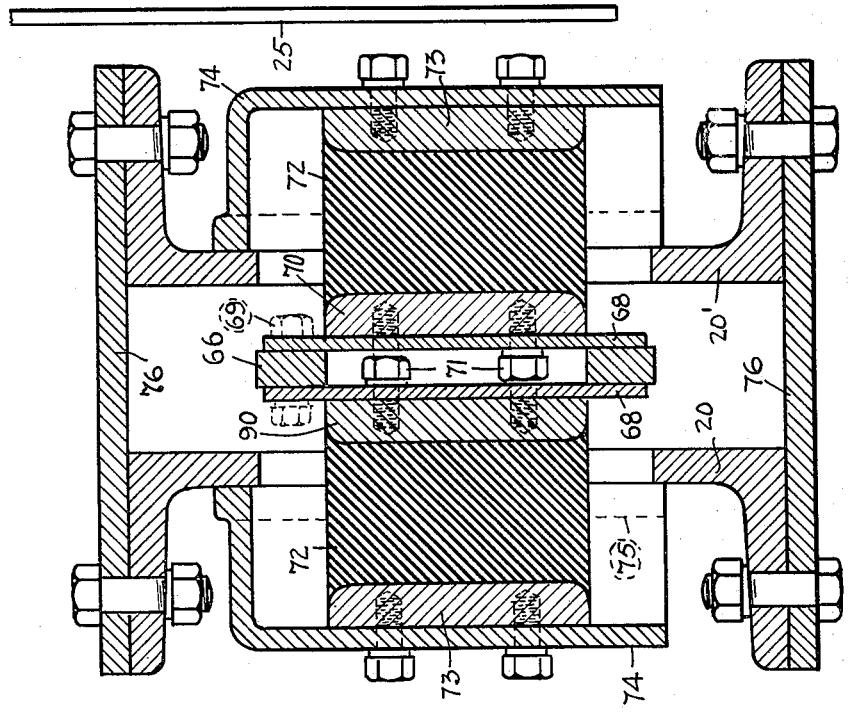
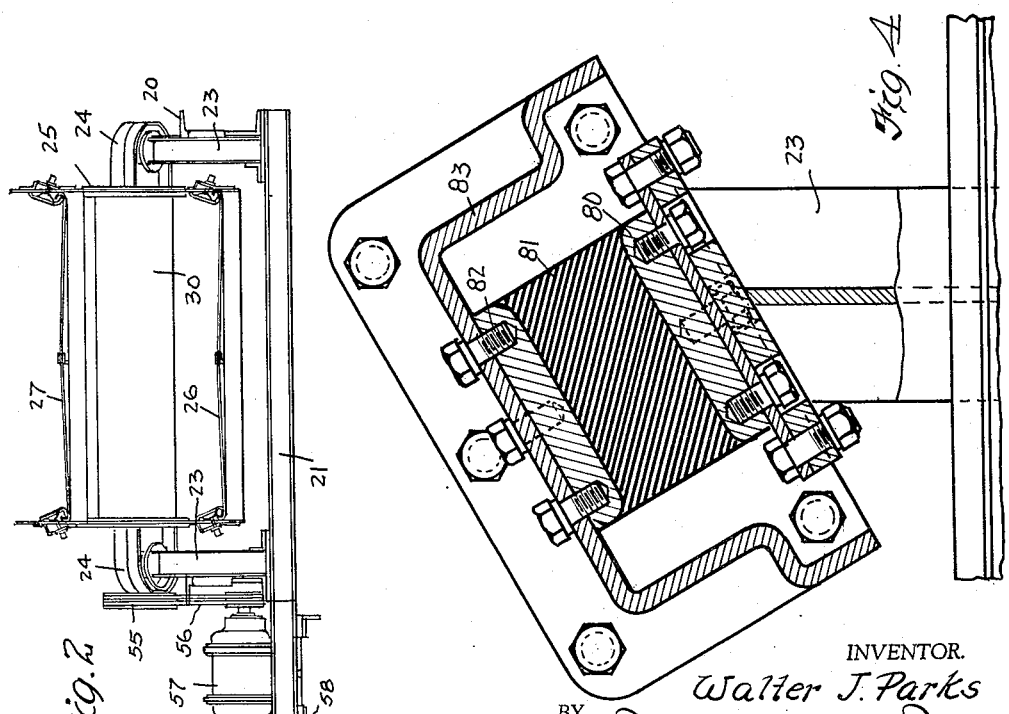
INVENTOR.
Walter J. Parks
BY Fay, Oberlin & Fay
ATTORNEYS.

Jan. 30, 1940. W. J. PARKS 2,188,482
RECIPROCATING MECHANISM
Filed Feb. 17, 1937 4 Sheets-Sheet 3
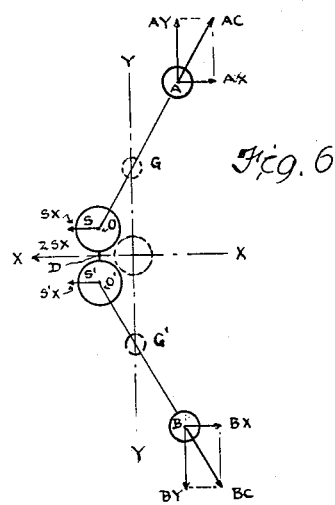
Fig. 6
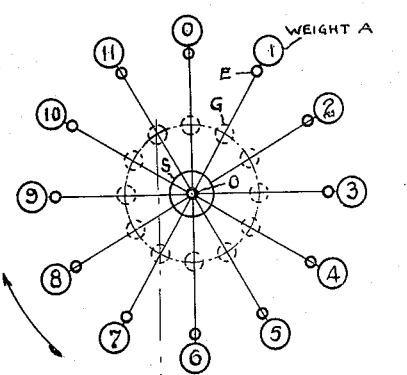
Fig. 7
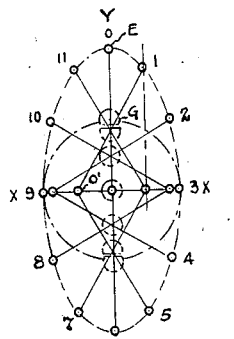
Fig. 11
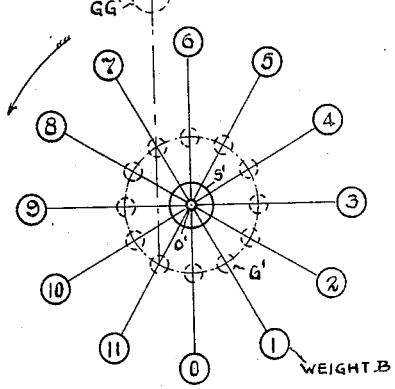
Fig. 8
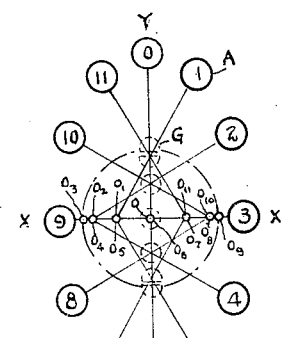
Fig. 9
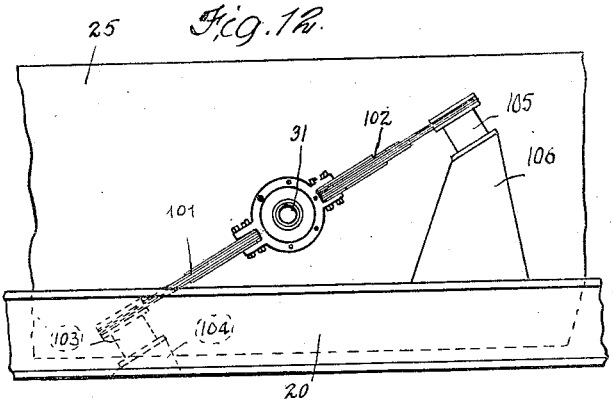
Fig. 12
Fig. 10
INVENTOR.
Walter J. Parks
BY Fay, Oberlin & Fay
ATTORNEYS.

Jan. 30, 1940.  W. J. PARKS  2,188,482
RECIPROCATING MECHANISM
Filed Feb. 17, 1937  4 Sheets-Sheet 4

INVENTOR.
Walter J. Parks
BY Fay, Oberlin & Fay
ATTORNEYS.

Patented Jan. 30, 1940

2,188,482

UNITED STATES PATENT OFFICE 2,188,482

RECIPROCATING MECHANISM

Walter J. Parks, Shaker Heights, Ohio

Application February 17, 1937, Serial No. 126,224

15 Claims. (Cl. 74—61)

The present invention relates to reciprocating mechanism such as reciprocating screen apparatus wherein movement of the reciprocating body is obtained by means of synchronized oppositely rotating weights or masses so connected to the body that the resultant force of their rotation is effective to produce a straight line motion of translation or reciprocation thereof. The general object and nature of my invention is to provide a balancing means so connected to and cooperating with the reciprocating mechanism as to compensate for and counter-balance the forces created in the resilient supports of the reciprocating body and to thereby eliminate vibration in the supporting or base structure of the apparatus.

My invention can be used in connection with apparatus for screening materials, wherein the reciprocating body of the mechanism becomes the screen frame or screen body. My invention is particularly adaptable to reciprocating screen apparatus for so-called "flat angle" or horizontal operation.

Briefly outlined, my invention, in its physical embodiment, consists of a screen body resiliently mounted on a supporting structure, with actuating or reciprocating means including synchronized, oppositely rotating weights or masses, and with means, such as connecting rods, eccentrically connected at one end to, and synchronized with, such actuating means; and also connected at the other end to the supporting structure by resilient means so that at this point such connecting means has instantaneous displacement at all times in the opposite direction to that of the motion of the screen body. By virtue of this construction, the forces generated in the resilient mountings of the connecting rods balance the forces generated in the resilient supports of the screen body by reciprocating movement of the latter; and hence little or no force, or vibration, is transmitted to the base structure of the apparatus. Additional objects and advantages of the invention will become apparent as the following description proceeds:

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 14:
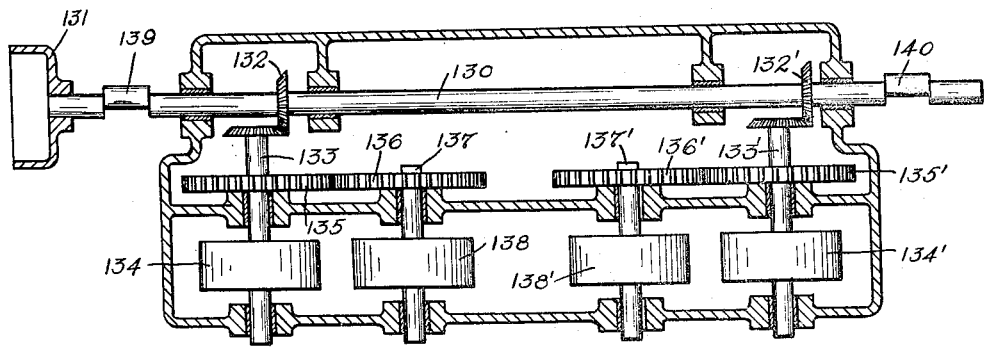

In said annexed drawings:

Fig. 1 is a side elevational view of the screening apparatus embodying the principle of my invention; Fig. 2 is an end elevational view of the apparatus shown in Fig. 1; Fig. 3 is an enlarged, detail sectional view taken substantially along line 3—3 of Fig. 1; Fig. 4 is an enlarged, detail sectional view of one of the screen frame resilient mountings; Fig. 5 is an enlarged detail sectional view of one of the connecting rod resilient mountings; Figs. 6 to 11 inclusive are diagrams illustrating and analyzing the motions and forces produced by the synchronized, oppositely rotating weights or masses; Fig. 12 is a plan view of a modified form of construction for the connecting means or connecting rods; Fig. 13 is a sectional view illustrating a modified form of construction for the oppositely rotating, synchronized mass reciprocating mechanism; and Fig. 14 is a sectional view illustrating another alternative form of construction for the oppositely rotating, synchronized mass reciprocating mechanism.

Before describing in detail the apparatus embodying the principle of my invention, an explanation and analysis of the motions and forces created by synchronized, oppositely rotating weights, as particularly illustrated in Figs. 6 to 11 should be made. In these latter figures, the reference characters represent the following:

A is a weight or mass rotating in a clockwise direction about the center O. B is a weight or mass rotating in a counter-clockwise direction about the center O'. The total mass of the screen body will be represented by SS' and for purposes of this description will be represented by two equal concentrated masses S and S' at the center of each rotating shaft and rigidly connected together. G and G' are the centers of gravity or mass of the weight S concentrated at O and the counterweight A and the weight S' concentrated at O' and the counterweight B respectively. GG' is the resultant center of mass of the entire system comprising the screen frame and the weights A and B.

The weights A and B are rotated synchronously in opposite directions about their respective centers O and O'. Their instantaneous relative positions are indicated by similar and corresponding reference numerals 0 to 11 respectively in Figs. 7 and 8. As both the weights A and B rotate about their respective shaft centers O and O', the respective centers of mass G and G' will also revolve in circular paths about the centers O and O'. The centers O and O' are in reality rigidly connected together by the bodies S and S', since the latter make up the complete screen frame mass.

The only external forces acting on the bodies A and B during their rotation with uniform angular velocity are the centrifugal forces AC and BC. These latter forces are shown diagrammatically in Fig. 6, for the position 1 of the weights A and B in Figs. 7 and 8. The rotating weights A and B are assumed to have equal masses and their centers of mass equidistant from their respective centers. Therefore the centrifugal forces AC and BC of Fig. 6 are equal.

Resolving the forces AC and BC into components AX and BX parallel to the X axis, and AY and BY parallel to the Y axis, it will be seen that the corresponding reactions transferred to the centers O and O' will exactly balance each other in the Y direction and so there will be no movement of the screen body SS' in that direction. But since the components AX and BX are both acting in the same direction along the X axis, a force equal to AX+BX is exerted upon the screen body SS'. In the particular position of the masses shown in Fig. 6 this force AX+BX is increasing and is therefore producing a change in the rate of motion of the screen body. Furthermore, as explained in my prior Letters Patent 2,066,362, if a system of bodies is freely suspended for rotation in space, they will at high speeds rotate about their resultant center of mass. Then under the conditions illustrated in Figures 6–11 the same tendency will be present but due to the constraint imposed by the rigid connection of the two shafts no motion along the Y-axis will occur but the X-component of motion will be the same in direction in both cases and for a given angular position of the counterweights the relative location of the bodies along the X-axis will be the same. Therefore, it can be deduced that the body SS' which is displaced to the left of the Y axis in Fig. 6, is undergoing a deceleration in the position shown and the screen body therefore reacts on the rotating shafts with a force 2SX which is equal in magnitude to AX+BX, acts opposite in direction and balances the latter force.

It will therefore be apparent, due to the above balanced forces, that at all times the bodies SS' and A and B are moving with instantaneous displacements along the X-axis in opposite direction.

Figs. 7 and 8, which in reality should be a single figure since the masses S and S' are integral, but are referred to as separate figures for convenient reference, show the several positions of the rotating weights A and B throughout a complete revolution. An analysis similar to the foregoing one, and for any other position of the rotating weights A and B, will show that during one complete revolution thereof, the position of G and G' along the X axis will not change and the circular movement of G and G' about O and O' respectively will be accomplished in such a manner that all horizontal displacements along the X axis will be accommodated by the point O moving in a negative direction, or in a direction opposite to that of A while displacement along the Y-axis will be accommodated by movement of the points G and G' in that direction.

The relative displacement along the two axes will, when combined, give the necessary circular motion of G and G' about O and O'. Therefore the points O and O' only move along the X axis and the points G and G' only move along the Y axis, both motions being straight line motions.

The center of mass of the entire system, viz., GG', of course, remains stationary during complete rotation of the weights A and B. It will thus be seen that the direction of reciprocating motion coincides with the X axis, and the latter is of course determined by the two points of instantaneous coincidence, or rather instantaneous angular coincidence, of the oppositely rotating weights. In the diagrams, Figs. 7 to 11 inclusive, these two points are points 3 and 9. If the angularity of the weights A and B with respect to their individual centers of rotation were to be so changed, that their starting points were moved to the points 1 and 11 respectively, then the X axis, or the direction of reciprocating motion would be changed to a line determined by the points 10 and 4 and 8 and 2. Or in other words, the direction of travel of the reciprocating motion will be determined by and will be on a line normal to the line joining the points of maximum distance between the rotating weights during the cycle of rotation.

Figs. 9 and 10 show the resultant paths of motion of the several points with respect to the entire mass center GG', as a fixed point. From this it will be seen that during one revolution of the weights A and B, the centers O and O' will move with a simple reciprocating motion along a straight line with an amplitude equal to twice the distance from the center of rotation of one of the weights A and B to the center of mass G or G' respectively, considering one-half the mass of the screen body concentrated at each of the centers. The location of the screen body with reference to the angular position of the rotating weights A and B is shown by the corresponding location of the centers $O_0$ to $O_{11}$ on the X axis. Also the linear motion of the points G and G' on the Y axis is shown in dotted lines together with the fixed position of the resultant center of the mass GG'.

Following this construction through in Fig. 11, it will be seen that if a point E in Fig. 7 is selected having a radius from the center of rotation of the weight A equal to twice that of the center of mass G, then during the free movement of the screen body in space, this point E will move in an elliptical path having instantaneous displacements along the X axis opposite to that of the screen body. Along the direction of motion, viz., the X axis, of the screen body, the total displacement of the point E will be equal to the travel of the screen body and the instantaneous positions of the point E will be exactly equal and opposite to those of the screen body. In the direction at right angles to the motion of the screen body, viz., along the Y axis, the point E will have twice the amplitude of motion.

Therefore in order to counter-balance the reciprocating motion of the screen body and the force exerted in its resilient supports which mount it to the base frame or structure, my invention provides for connecting means or connecting rods from an eccentric point, such as the point E, to the base frame or structure with resilient means mounting the connecting means to the base frame.

The foregoing principles of my invention are embodied in the apparatus shown in Figs. 1 to 5. The apparatus shown therein includes a supporting member or base frame consisting of the longitudinally extending side channels 20 and the lateral I-beams 21. The base frame may be mounted directly and rigidly to the supporting structure or supported by means of suspension cables 22. The base frame also carries vertical uprights 23, located adjacent the four corners thereof, which in turn are connected through the resilient support housings 23 to the reciprocating screen frame 25 with the interposition of resilient members 81 of Fig. 4. The screen frame 25 may carry any number of screen decks or screens proper as indicated at 26 and 27.

The reciprocating mechanism housing 30 may be mounted substantially at the center of gravity of the screen frame 25 or so placed that the line of action of the reciprocating mechanism passes approximately through the center of gravity of the frame 25. The location of the element is not limited to this position, however, as some conditions may arise in practice that will make advisable some displacement of this line of action from the center of gravity whereby a small rocking action of the screen is obtained. The housing 30 carries a pair of parallel shafts 31 and 32 journalled in the bearings 33 and 34 at one end and 35 and 36 at the opposite end. Gears 37 and 38, keyed to the shafts 31 and 32 respectively mesh with each other and being of equal ratio, thus maintain synchronous rotation of the shafts. The intermediate portion of the shafts 31 and 32 are in the form of eccentric cylinders 39 and 40 respectively.

A plurality of hollow weights 41, 42, 43, 44, 45, 46 and 47 are mounted on the eccentric cylindrical portion 39 and secured in adjustable position with respect thereto by means of the screws 48. A similar set of weights 41' to 47' inclusive are mounted on the eccentric cylindrical portion 40. The weights 41 to 47 inclusive and 41' to 47' are in effect hollow sleeves of varying cross sectional thickness, increasing from a minimum from one side to a maximum at the opposite side. A portion of the walls of some of the eccentric weights, such as the weights 42, 44, 46, 42', 44' and 46', are removed as indicated at 49, 50, 51, 49', 50' and 51', in order to obtain a greater eccentric distribution of their masses.

Vernier gauges, such as indicated at 52 and 53, are marked along the edge of the eccentric weights, in order to indicate their relative positions of rotative adjustment with respect to the shaft portions 39 and 40. Suitable openings (not shown) are provided in the housing 30 for access to the interior, and especially to the fastening studs 48 and 48' so that the several eccentric weights, such as the weights 42, 44, 46, 42', 44', 46' can be adjusted to the desired position of balance.

The eccentricity of the cylindrical portions 39 and 40 and the attached weights 41 to 47 and 41' to 47' inclusive respectively, as shown in Fig. 3 is apparently in such a direction as to produce a resultant reciprocating movement in a horizontal line. In other words, the location of the eccentric masses on the shafts 31 and 32, as shown in Fig. 3, is such that their points of instantaneous angular coincidence are in a horizontal line. By adjustment of the eccentric masses, such as by changing the mesh of the gears 37 and 38 so that the points of instantaneous angular coincidence of the rotating masses will occur in a line 30° inclined from the vertical, the resultant direction of reciprocating movement will then be in a line 30° inclined from the horizontal as indicated in Fig. 1.

The outer end of the shaft 31 carries a drive pulley 55 which is connected by means of a multiple V belt 56 to a drive pulley on the electric motor 57. The motor 57 is in turn carried by a sub-frame 58 attached to the base frame members 21.

Eccentric portions 60 and 61 are located adjacent the exterior ends of the shaft 31 and have their eccentricities extending in the same direction as that of the eccentric cylindrical portion 39 and of the eccentric weights 41 to 47 inclusive. Connecting rods 62 and 63 are mounted on the eccentric portions 60 and 61 respectively, by means of the bearings 64 and 65 respectively.

The other ends of the connecting rods 62 and 63 are of flattened, circular form with a central opening, as indicated at 66 and 67 respectively, and are bolted to the plates 68 by suitable fastening bolts 69. The plates 68 in turn are secured to the plates 70 by the studs 71. The plates 70 are vulcanized to the flexible rubber blocks 72 which are also vulcanized to the plates 73 bolted to the housing 74. The latter are in turn carried by the channel beam 20 of the base frame. One of the housings 74 is mounted directly to the channel beam 20 through its flange 75, and the other of the housings is similarly mounted to a channel beam section 20' which latter is connected to the main channel beam 20 through the tie plates 76.

The vertical supports 23 have their upper ends attached to the plates 80 which are vulcanized to the rubber blocks 81. Plates 82 are similarly vulcanized to the other side of the rubber blocks 81 and are mounted on the housing 83. The housing 83 is in turn bolted to the side of the screen frame 25. It will be noted that the resilient rubber block 81 is disposed at an angle of 30° to the horizontal, which is, as will be subsequently explained in this case, the direction of travel of the reciprocating movement of the screen frame 25.

The operation of the above described apparatus is as follows:

The shaft 31 is driven through the drive motor 57 and pulley 55, which in turn rotates the shaft 32 in an opposite direction through the gears 37 and 38, and at a synchronous speed. As pointed out in the previous explanation in connection with Figs. 6 to 11 inclusive, the eccentrically mounted masses or weights on the shafts 31 and 32, being rotated in opposite directions, will then tend to reciprocate the screen frame by which they are carried, in a definite path of travel and this will cause the resilient supports to exert a force against the base frame. But since the connecting rods 62 and 63 are eccentrically connected to the shaft 31, or the center of rotation of the latter and its eccentric mass, and since such eccentric connection is in the same direction away from the center of the shaft as that of the eccentricity of the weights, they will in turn generate forces on their resilient members 72 which will balance the reaction of members 81 on the base frame. It is assumed that members 72 and 81 are either equally stiff in the direction of their displacement or proportionately so as their relative travel where the eccentricity of the connecting rod gives a travel less than the screen body or vice versa. As seen in Fig. 1, the connecting rods 62 and 63 are inclined at an angle of 30° from the horizontal and thus their counter-balancing force will be exerted upon the base frame at a similar angle to that of the direction of travel of the screen body which has, tentatively, been assumed to be at 30° to the horizontal, as indicated by the double headed arrow in Fig. 1. It will also be noted that the center line of the drive motor 57 and the pulley 55 is at right angles to the center line of connecting rod 62 (or the direction of travel of the reciprocating movement of the screen frame 25) so that the reciprocating movement of the drive pulley 55 can be accommodated and the distance from its center to that of the center of the drive shaft of the motor 57 will remain substantially constant.

It is also apparent from Fig. 11 that if the driving pulley 55 is journalled on the drive shaft with an eccentricity of one half that of point E or, in other words, if pulley 55 is journalled eccentrically so that its center is at G, the drive center line could equally well be parallel to the connecting rod 62.

The resilient mountings for the screen frame 25, consisting of the rubber blocks 81, are so disposed at an angle of 30° to the horizontal that the displacement caused by the travel of the screen body is accompanied by a movement of the backing plates 80 and 82 parallel to each other resulting in only a shear displacement of the rubber between the two. This is desirable as for a given travel of the screen body the least displacement of the rubber will occur with a minimum of heating due to internal friction. Also by this mounting the weight of the screen body and its attached parts is carried principally by the rubber in compression causing the least deflection and also decreasing the stress on the bond between the rubber and attached steel parts. This gives a greater factor of safety and increased load carrying capacity of these units.

The resilient members 72 are mounted in a different manner from those supporting the screen as they do not carry much of the weight of the screen body although they do assist in carrying this weight and locating the screen body by opposing that component of the load reaction resisted by members 81 in shear. Therefore because of the fact that in the position shown, members 72 will have the same shear displacement during operation as members 81 and are of the same stiffness, the reactions of the two on the base frame will be equal.

It is equally obvious, however, that the type of mounting used for members 72 could be used for members 81 and conversely the mounting used for member 81 would be used for member 72.

The principal difference in the two mountings is that that of member 81 is directional in character because these members are relatively stiff in compression as compared to shear and will therefore always tend to restrict any movement parallel to the longitudinal axis of the mountings while permitting relatively free movement parallel to the surface of the confining plates. This directional function where the line of action of the actuating mechanism passes through the center of gravity of the body and a translational movement is desired is not important but would be where the line of action is displaced from the center of gravity and the same motion is desired.

Conversely mounting 72 is not directional in action and requires the line of action of the actuating mechanism to act through the center of gravity of the screen body where a translational motion is desired.

Other designs of resilient mountings such as leaf springs, coil springs, torsional springs and hangar bars could be employed in the design without affecting the resultant action derived therefrom.

The resilient reactions created in the resilient mounting blocks 81 will of course be met with an equal resilient reaction in the resilient blocks 72 through which the connecting rods 62 and 63 are attached to the base frame. In this manner, spring or resilient action is opposed and counterbalanced with an equal and opposite spring or resilient action. In this manner the vibration heretofore created through such forces and motions is eliminated due to proper balancing.

In Fig. 12 there is shown an alternative form of connecting the eccentric portions on the ends of the shaft 31 to the side panels 20 of the supporting frame. In this latter form of construction, the connecting rods are in the form of leaf springs 101 and 102. The leaf spring 101 has its lower end carried by the resilient rubber block 103 which in turn is connected to the side channel 20 by the mounting 104. The leaf spring 102 has its upper end connected to the resilient rubber block 105 which in turn is carried by the mounting 106 also attached to the channel 20. By use of the alternative form of construction shown in Fig. 12, that portion of the weight of the screen body 25 and of its attached mechanism, which is supported through the connecting rods on the shaft 31, is distributed to the resilient supporting blocks 103, 105. In this manner it is possible to more definitely locate the screen body and the weight thereof supported through the connecting rods 101, 102 is distributed to points on both sides of the shaft 31.

In the alternative form of construction for the oppositely rotating weight mechanism shown in Fig. 13, the drive shafts carrying the weights are located on a common axis. Thus, driving power is supplied through the pulley 110 to the drive shaft 111 which carries an eccentric weight 112. Through the bevel gear 113 mounted on the end of the shaft 111 and meshing with the bevel gear 114 carried by the stub shaft 115 mounted in the housing 116, rotation in an opposite direction is transmitted to the shaft 117 through the bevel gear 118. The shaft 117 carries the eccentric weights 119 and 120. A similar bevel gear connection, as indicated generally at 121 again reverses the direction of rotation of the shaft 117 to the shaft 122 carrying the eccentric weight 123. The shaft 122 will thus rotate in the same direction as the shaft 111. Eccentric bearing portions 124 and 125 on the exterior ends of the shafts 111 and 122 respectively are adapted for connections through connecting means or connecting rods (not shown) to the supporting frame.

In the alternative form of construction shown in Fig. 14, the oppositely rotating weights are carried on shafts separate and distinct from the drive shaft. In the latter form of construction, the main drive shaft 130 is driven through the drive pulley 131. Bevelled gears 132 and 132' transmit rotation from the main drive shaft 130 to the auxiliary shafts 133 and 133', which latter in turn carry the eccentric weights 134 and 134'. Gears 135, 136 and 135', 136' transmit rotation in an opposite direction to the auxiliary shafts 137 and 137' respectively. The last two shafts carry the eccentric weights 138 and 138' which of course rotate in an opposite direction and synchronously with the weights 134 and 134'. Eccentric bearing portions 139 and 140 on the main drive shaft 13 are connected through suitable connecting means or conecting rods (not shown) to the supporting frame.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a machine of the character described, a plurality of symmetrically disposed, resiliently supported vibrating bodies, an actuating mechanism adapted having substantially straight line reciprocating movement directly engaging one of said bodies and solely supported thereby, eccentric means on said actuating mechanism and means connecting said eccentric means to the other of said bodies for moving said bodies simultaneously in opposite directions.

2. A reciprocating mechanism comprising the combination of a reciprocating body, a supporting member, resilient means mounting said body on said supporting member, actuating mechanism having substantially straight line reciprocating movement, said actuating mechanism being connected to said body, and means connecting said actuating mechanism to said supporting member for imparting straight line reciprocating movement opposite to and balancing such first-named reciprocating movement.

3. A reciprocating mechanism comprising the combination of a reciprocating body, a supporting member, resilient means mounting said body on said supporting member, actuating mechanism having substantially straight line reciprocating movement, said actuating mechanism being connected to said frame, and means connecting said actuating mechanism to said supporting member for imparting straight line reciprocating forces equal and opposite to those generated by such first-named reciprocating movement of said body to said supporting member.

4. A reciprocating mechanism comprising the combination of a reciprocating body, a supporting member, resilient means mounting said body on said supporting member, actuating mechanism including oppositely rotating, synchronized masses for imparting reciprocating movement to said body, and means synchronously connected to said masses and to said supporting member for imparting straight line reciprocating movement balancing the forces generated by such first-named reciprocating movement.

5. A reciprocating mechanism comprising the combination of a reciprocating body, a supporting member, resilient means mounting said body on said supporting member, actuating mechanism including oppositely rotating, synchronized masses and means for rotating said masses, said actuating mechanism being adapted to impart a reciprocating movement to said body, and means eccentrically connected to said rotating means and to said supporting member for balancing the forces generated by such reciprocating movement.

6. A reciprocating mechanism comprising the combination of a reciprocating body, a supporting member, resilient means mounting said body on said supporting member, actuating mechanism including oppositely rotating, synchronized masses and means for rotating said masses, said actuating mechanism being adapted to impart a reciprocating movement to said body, said actuating mechanism being so mounted on said body that its line of action passes substantially through the center of gravity thereof, and means synchronously connected to said masses and to said supporting member for balancing the forces generated by such reciprocating movement.

7. A reciprocating mechanism comprising the combination of a reciprocating body, a supporting member, resilient means mounting said body on said supporting member, actuating mechanism including oppositely rotating, synchronized masses and means for rotating said masses, said actuating mechanism being adapted to impart a reciprocating movement to said body, said actuating mechanism being mounted on said body substantially at the center of gravity thereof, and means eccentrically connected to said rotating means and to said supporting member for balancing the forces generated by such reciprocating movement.

8. A reciprocating mechanism comprising the combination of a reciprocating body, a supporting member, resilient means mounting said body on said supporting member, actuating mechanism including oppositely rotating, synchronized masses adapted to impart a reciprocating movement to said body, means connected to said actuating mechanism and adapted to produce a reciprocating movement opposite to that of said body, and a second resilient means connecting said last-named means to said supporting member.

9. A reciprocating mechanism comprising the combination of a reciprocating body, a supporting member, resilient means mounting said body on said supporting member, actuating mechanism including oppositely rotating, synchronized masses adapted to impart a reciprocating movement to said body, means connected to said actuating mechanism, and a second resilient means connecting said last-named means to said supporting member, both of said resilient means being of substantially equal stiffness.

10. A reciprocating mechanism comprising the combination of a reciprocating body, a supporting member, resilient means mounting said body on said supporting member, actuating mechanism including oppositely rotating, synchronized masses, means synchronously connected to said masses and to said supporting member for balancing such reciprocating movement, and a second resilient means mounting said last-named means on said supporting member.

11. A reciprocating mechanism comprising the combination of a reciprocating body, a supporting member, resilient means mounting said body on said supporting member, actuating mechanism including oppositely rotating, synchronized masses and means for rotating said masses, said actuating mechanism being adapted to impart a reciprocating movement to said body, means eccentrically connected to said rotating means and to said supporting member for balancing such reciprocating movement, and a second resilient means mounting said ecentrically connected means on said supporting member.

12. A reciprocating mechanism comprising the combination of a reciprocating body, a supporting member, resilient means mounting said body on said supporting member, actuating mechanism including oppositely rotating, synchronized masses, and means for rotating said masses, said actuating mechanism being adapted to impart a reciprocating movement to said body, said actuating mechanism being mounted on said body substantially at the center of gravity thereof, means eccentrically connected to said rotating means and to said supporting member for balancing such reciprocating movement, and a second resilient means mounting said eccentrically connected means on said supporting member.

13. A reciprocating mechanism comprising the combination of a reciprocating body, a supporting member, resilient means mounting said body on said supporting member, actuating mechanism including oppositely rotating synchronized masses, a drive shaft for rotating said masses, said actuating mechanism being mounted on said body substantially at the center of gravity thereof and adapted to impart reciprocating movement thereto, and connecting rods ececntrically connected to said drive shaft and resiliently connected to said supporting member, the eccentricity of the first-named connection being in the opposite direction from that of such reciprocating movement.

14. A reciprocating mechanism comprising the combination of a reciprocating body, a supporting member, resilient means mounting said body on said supporting member, actuating mechanism including oppositely rotating synchronized masses, a drive shaft for rotating said masses, said actuating mechanism being mounted on said body substantially at the center of gravity thereof and adapted to impart reciprocating movement thereto, and connecting rods eccentrically connected to said drive shaft, and a second resilient means connecting said connecting rods to said supporting member, both of said resilient means being of substantially equal stiffness.

15. A reciprocating mechanism comprising the combination of a reciprocating body, a supporting member, resilient means mounting said body on said supporting member, actuating mechanism including oppositely rotating synchronized masses, a drive shaft for rotating said masses, said actuating mechanism being mounted on said body substantially at the center of gravity thereof and adapted to impart reciprocating movement thereto, connecting rods eccentrically connected to said drive shaft and resiliently connected to said supporting member, a driving motor, and a power transmission connection between said motor and said shaft, the center line of said shaft and of said motor being on a line substantially normal to the direction of travel of such reciprocating movement.

WALTER J. PARKS.